(12) United States Patent
Ju et al.

(10) Patent No.: US 10,126,486 B2
(45) Date of Patent: Nov. 13, 2018

(54) LAMP

(71) Applicants: Radiant Opto-Electronics (Suzhou) Co., Ltd., Wujiang Jiangsu (CN); Radiant Opto-Electronics Corporation, Kaohsiung (TW)

(72) Inventors: Chih-Hung Ju, Kaohsiung (TW); Guo-Hao Huang, Kaohsiung (TW); Kun-Feng Chen, Kaohsiung (TW)

(73) Assignees: RADIANT OPTO-ELECTRONICS (SUZHOU) CO., LTD., Wujiang Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 44 days.

(21) Appl. No.: 15/310,190

(22) PCT Filed: Dec. 30, 2015

(86) PCT No.: PCT/CN2015/099797
§ 371 (c)(1),
(2) Date: Nov. 10, 2016

(87) PCT Pub. No.: WO2017/101164
PCT Pub. Date: Jun. 22, 2017

(65) Prior Publication Data
US 2018/0039014 A1    Feb. 8, 2018

(30) Foreign Application Priority Data
Dec. 15, 2015  (CN) .......................... 2015 1 0932758

(51) Int. Cl.
*F21V 8/00* (2006.01)
*F21V 23/00* (2015.01)
(Continued)

(52) U.S. Cl.
CPC ............ *G02B 6/0083* (2013.01); *F21S 8/061* (2013.01); *F21V 23/001* (2013.01); *F21V 23/02* (2013.01);
(Continued)

(58) Field of Classification Search
CPC .... G02B 6/0083; G02B 6/0088; G02B 6/009; G02B 6/0091; F21S 8/061; F21S 8/068; F21V 23/001; F21V 23/02
See application file for complete search history.

(56) References Cited

U.S. PATENT DOCUMENTS 6,135,615 A   10/2000  Lee
8,052,315 B2  11/2011  Iwasaki
(Continued)

FOREIGN PATENT DOCUMENTS

CN   101495801 B   3/2011
CN   203454008 U   2/2014
(Continued)

*Primary Examiner* — Mary Ellen Bowman
(74) *Attorney, Agent, or Firm* — McClure, Qualey & Rodack, LLP

(57) ABSTRACT

A lamp is provided. The lamp includes a frame body, a light guide plate and plural light sources. The frame body has an accommodating space. The frame body includes at least one integrating member and plural side covers, and the integrating member includes a conductive assembly. The light guide plate is disposed in the accommodating space. The light sources are respectively disposed in the side covers and disposed adjacent to side edges of the light guide plate. The conductive assembly is disposed on one side of the integrating member near the light guide plate, and the conductive assembly is connected to the light sources to form an electrical loop.

13 Claims, 13 Drawing Sheets

(51) Int. Cl.
*F21V 23/02* (2006.01)
*F21S 8/06* (2006.01)

(52) U.S. Cl.
CPC ........... *G02B 6/009* (2013.01); *G02B 6/0088* (2013.01); *G02B 6/0091* (2013.01)

(56) References Cited

U.S. PATENT DOCUMENTS

| | | | | |
|---|---|---|---|---|
| 9,664,365 | B2* | 5/2017 | Myers | F21V 23/023 |
| 2012/0257383 | A1* | 10/2012 | Zhang | F21S 2/005 |
| | | | | 362/235 |
| 2013/0044512 | A1* | 2/2013 | Araki | F21S 8/04 |
| | | | | 362/607 |

FOREIGN PATENT DOCUMENTS

| | | |
|---|---|---|
| CN | 204403887 U | 6/2015 |
| CN | 204534349 U | 8/2015 |
| TW | M508004 U | 9/2015 |

* cited by examiner

LAMP

RELATED APPLICATIONS

This application is the U.S. national phase under § 371 of International Application No. PCT/CN2015/099797 filed Dec. 30, 2015, which claims priority from China Patent Application Serial Number 201510932758.3, filed Dec. 15, 2015. The entire contents of each of which are incorporated by reference.

BACKGROUND

Field of Invention

The present invention relates to an illuminating device. More particularly, the present invention relates to a lamp.

Description of Related Art

Lamps become more diversified to meet market requirements. One of conventional lamps is a hanging transparent lamp which can achieve better appearance and illumination.

However, most of hanging transparent lamps uses externally exposed wires to connect to a power supply. Such externally exposed wires not only have complicated assembling processes and high manufacturing cost, but also result in a messy visual effect in a space.

SUMMARY

One object of the present invention is to provide a lamp in which an integrating member with an electrical connection function is used to integrate a power supply, a light source and a light guide plate, thereby completing the assembly of the lamp that has a simple structure and can be rapidly assembly.

According to the aforementioned object, a lamp is provided. The lamp includes a frame body, a light guide plate and plural light sources. The frame body has an accommodating space. The frame body includes at least one integrating member and plural side covers, and the integrating member includes a conductive assembly. The light guide plate is disposed in the accommodating space. The light sources are respectively disposed in the side covers and disposed adjacent to side edges of the light guide plate. The conductive assembly is disposed on one side of the integrating member near the light guide plate, and the conductive assembly is connected to the light sources to form an electrical loop.

According to an embodiment of the present invention, the lamp further includes a power supply, and the power supply includes a first power supply terminal and a second power supply terminal. The integrating member includes a main body and a plurality of electrical connectors. The conductive assembly includes a first conductive plate, a second conductive plate and a third conductive plate. The first conductive plate is disposed on the main body and is electrically connected to the first power supply terminal. The second conductive plate is disposed on the main body. The third conductive plate is disposed on the main body and is electrically connected to the second power supply terminal. The first conductive plate, second conductive plate and the third conductive plate are spaced from each other at distances, and the first conductive plate and the second conductive plate are electrically connected to each other via one portion of the electrical connectors, and the second conductive plate and the third conductive plate are electrically connected to each other via the other portion of the electrical connectors.

According to an embodiment of the present invention, the light guide plate has a first light-incident surface and a second light-incident surface. The light sources include a first light source and a second light source. The first light source is disposed adjacent to the first light-incident surface, in which the first light source is electrically connected between the first conductive plate and the second conductive plate. The second light source is disposed adjacent to the second light-incident surface, in which the second light source is electrically connected between the second conductive plate and the third conductive plate.

According to an embodiment of the present invention, the electrical connectors includes a first conductive post, a second conductive post, a third conductive post and a fourth conductive post, in which the first conductive post is electrically connected to the first conductive plate, and the second conductive post and the third conductive post are electrically connected to the second conductive plate, and the fourth conductive post is electrically connected to the third conductive plate.

According to an embodiment of the present invention, the first light source includes a first input terminal and a first output terminal. The first input terminal is electrically connected to the first conductive post. The first output terminal is electrically connected to the second conductive post. The second light source includes a second input terminal and a second output terminal. The second input terminal is electrically connected to the third conductive post. The second output terminal is electrically connected to the fourth conductive post.

According to an embodiment of the present invention, the integrating member includes a first connecting base and a second connecting base. The first connecting base is disposed on the main body, in which a portion of the first conductive plate is embedded in the first connecting base. The second connecting base is disposed on the main body, in which a portion of the third conductive plate is embedded in the second connecting base.

According to an embodiment of the present invention, the lamp further includes a first charged cable and a second charged cable. One end of the first charged cable is connected to the first power supply terminal of the power supply, and the other end of the first charged cable is fixed on the first connecting base and is connected to the first conductive plate. One end of the second charged cable is connected to the second power supply terminal of the power supply, and the other end of the first charged cable is fixed on the second connecting base and is connected to the third conductive plate.

According to an embodiment of the present invention, the other end of the first charged cable is fixed on the first connecting base via a first conductive base. The other end of the second charged cable is fixed on the second connecting base via a second conductive base.

According to an embodiment of the present invention, the lamp further includes a first tube and a second tube. The first tube is connected to a first through hole of the first connecting base, and the other end of the first charged cable passes through the first through hole and is extended into the first tube. The second tube is connected to a second through hole of the second connecting base, and the other end of the second charged cable passes through the second through hole and is extended into the second tube.

According to an embodiment of the present invention, the main body of the integrating member is an insulation, and one portion of each of the first conductive plate, the second conductive plate and the third conductive plate is embedded in the main body, and the other portion of each of the first conductive plate, the second conductive plate and the third conductive plate is exposed out of the main body.

According to an embodiment of the present invention, the integrating member includes a reinforced plate, and the reinforced plate is embedded in the main body and is not connected to the first conductive plate, the second conductive plate and the third conductive plate.

According to an embodiment of the present invention, the frame body includes an assembly frame, and a first side of the light guide plate is disposed on the integrating member, and a second side opposite to the first side of the light guide plate is disposed on the assembly frame.

According to an embodiment of the present invention, the assembly frame includes a first assembly base and a second assembly base.

According to an embodiment of the present invention, the lamp further includes a first uncharged cable and a second uncharged cable. One end of the first uncharged cable is connected to the first assembly base, and the other end of the first uncharged cable is extended out of the first assembly base. One end of the second uncharged cable is connected to the second assembly base, and the other end of the second uncharged cable is extended out of the second assembly base.

According to an embodiment of the present invention, the other end of the first uncharged cable is fixed on the first assembly base via a first non-conductive base. The other end of the second uncharged cable is fixed on the assembly base via a second non-conductive base.

According to an embodiment of the present invention, the first tube is connected to a first through hole of the first assembly base, and the other end of the first uncharged cable passes through the first through hole and is extended into the first tube. The second tube is connected to a second through hole of the second assembly base, and the other end of the second uncharged cable passes through the second through hole and is extended into the second tube.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
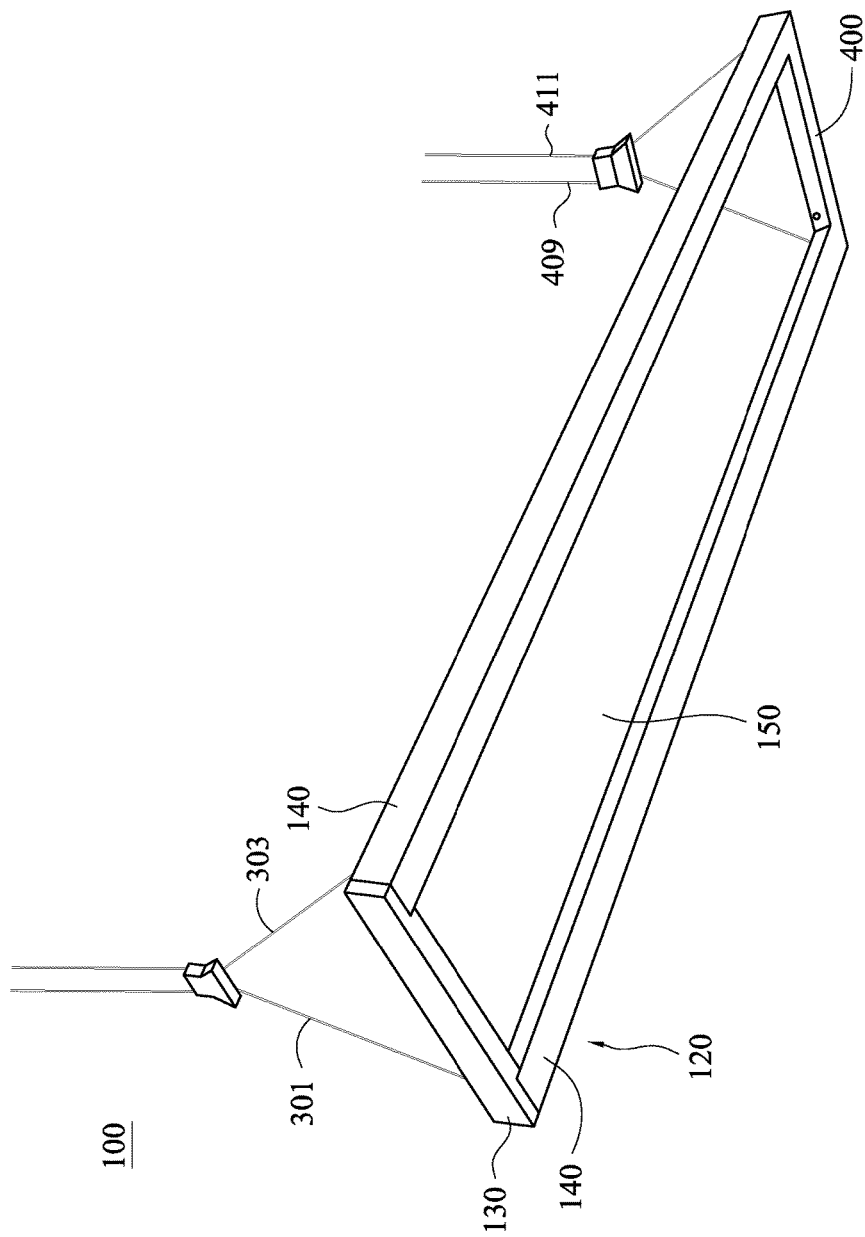
FIG. 1A is a schematic structural diagram showing a lamp in accordance with an embodiment of the present invention.
Figure 1B:
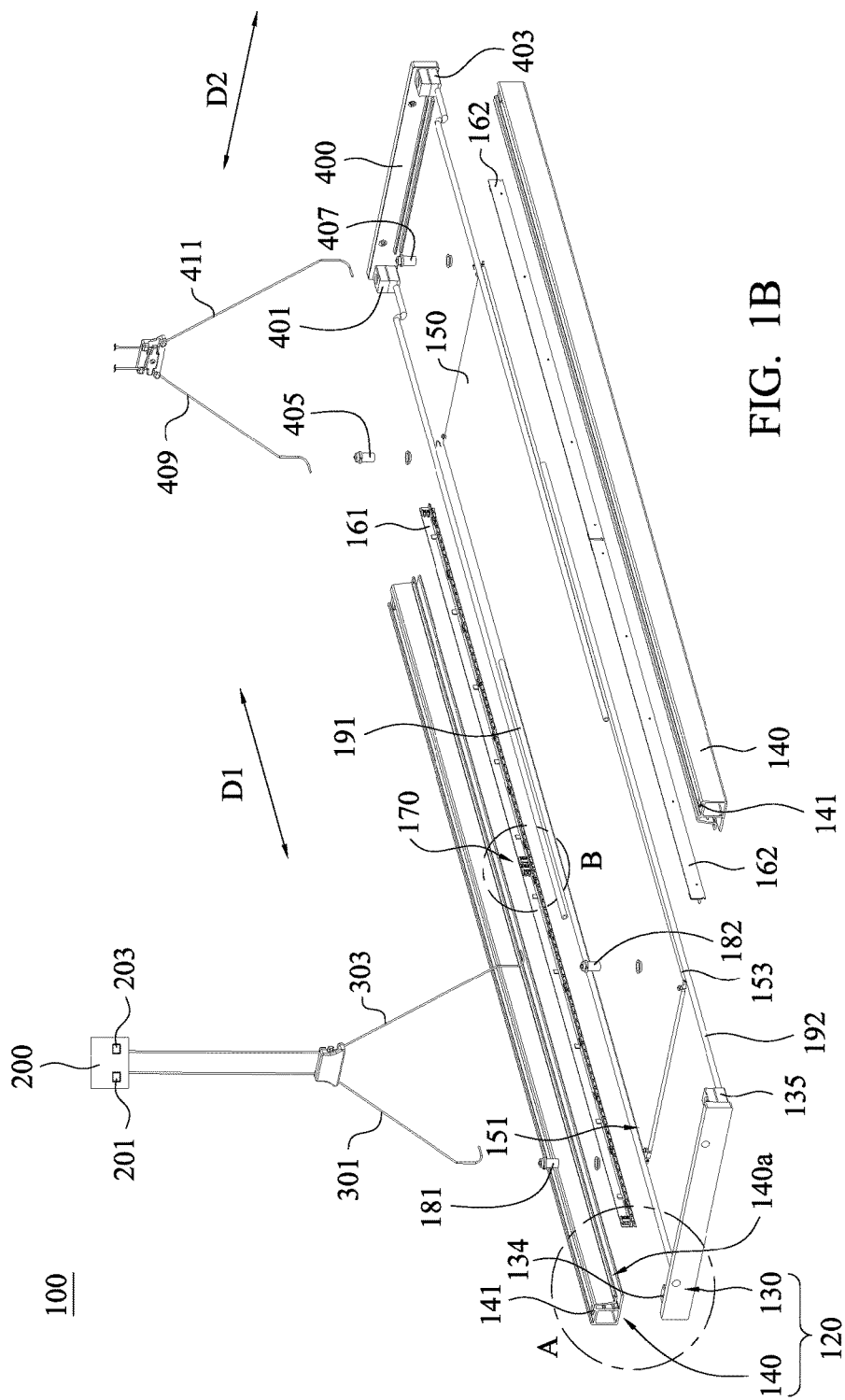
FIG. 1B is a schematic exploded view showing the lamp in accordance with an embodiment of the present invention.
Figure 2A:
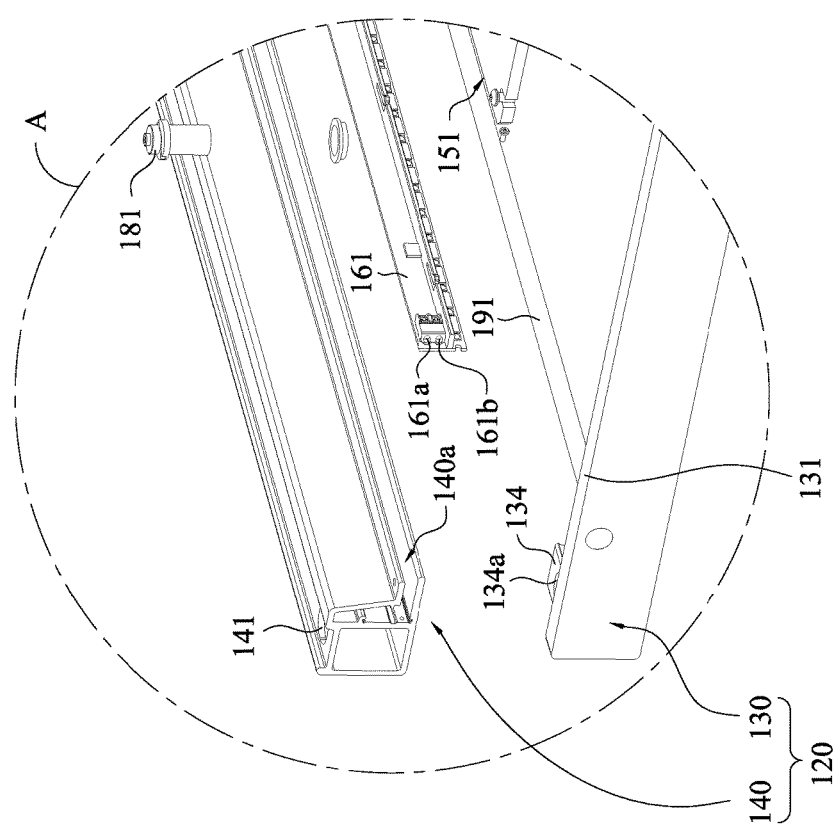
FIG. 2A is an enlarged view of zone "A" in FIG. 1B.
Figure 2B:
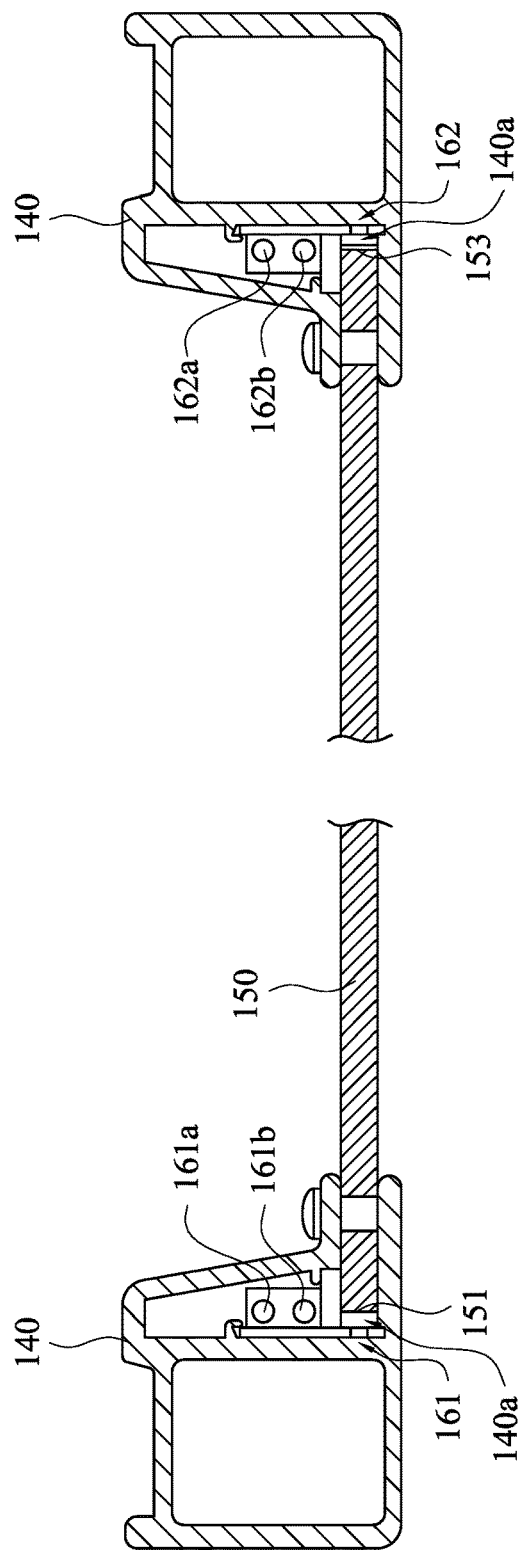
FIG. 2B is a schematic diagram showing a light guide plate disposed on side covers.
Figure 3A:
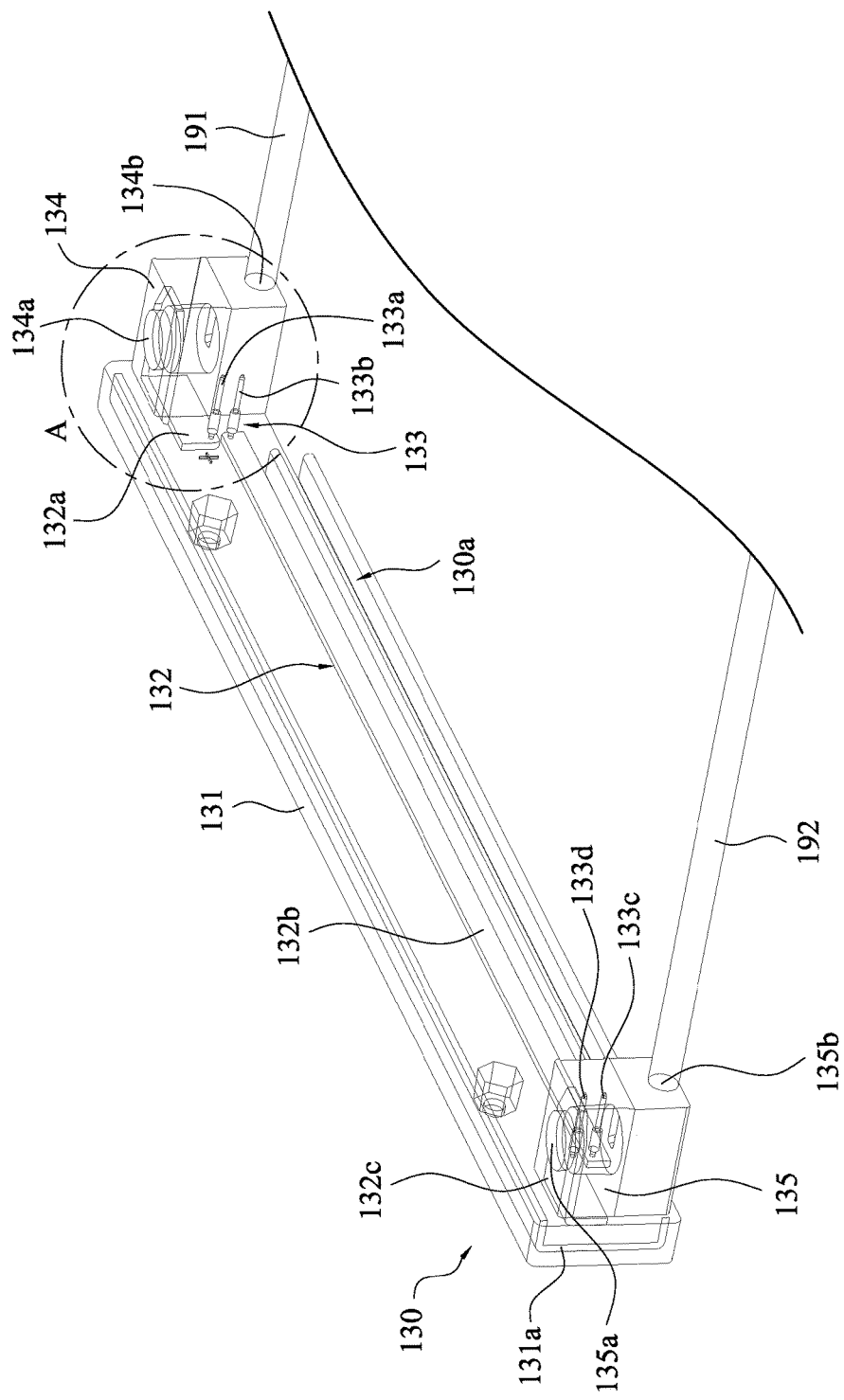
FIG. 3A is a partial structural diagram showing an integrating member in accordance with an embodiment of the present invention.

Reference will now be made in detail to the present embodiments of the invention, examples of which are illustrated in the accompanying drawings. Simultaneously referring to FIG. 1A, FIG. 1B and FIG. 2A, FIG. 1A and FIG. 1B are a schematic structural diagram and a schematic exploded view showing a lamp in accordance with an embodiment of the present invention, and FIG. 2A is an enlarged view of zone "A" in FIG. 1B. A lamp 100 mainly includes a frame body 120, a light guide plate 150 and plural light sources (i.e. a first light source 161 and a second light source 162). As shown in FIG. 1B and FIG. 2A, the frame body 120 includes at least one integrating member 130 and plural side covers 140, in which the integrating member 130 and the side covers 140 are configured to clamp and fix the light guide plate 150. In addition, simultaneously referring to FIG. 1B, FIG. 2A, FIG. 2B and FIG. 3A, in which FIG. FIG. 2B is a schematic diagram showing the light guide plate disposed on side covers, and FIG. 3A is a partial structural diagram showing the integrating member in accordance with an embodiment of the present invention. As shown in FIG. 1B and FIG. 2B, each of the side covers 140 has an accommodating area 140a. As shown in FIG. 3A, the integrating member 130 has an accommodating space 130a. In the present embodiment, side edges of the light guide plate 150 are fixed in the accommodating areas 140a and the accommodating space 130a.

Referring to FIG. 1B, FIG. 2A and FIG. 2B again, in some embodiments, each of the side covers is a heat sink. In the present embodiment, the number of the side covers 140 is two, and the side covers 140 are respectively disposed on the two opposite sides of the light guide plate 150. In the present embodiment, the first light source 161 and the second light source 162 are respectively disposed in each of the accommodating area 140a of the side cover 140. Preferably, the first light source 161 and the second light source 162 are disposed along a first direction D1. In addition, the light guide plate 150 has a first light-incident surface 151 and a second light-incident surface 153, and a portion of light guide plate 150 adjacent to the first light-incident surface 151 and a portion of light guide plate 150 adjacent to the second light-incident surface 153 are respectively located in the accommodating areas 140a of the opposite side covers 140. Therefore, light generated by the first light source 161 and the second light source 162 can enter the light guide plate 150 from the first light-incident surface 151 and the second light-incident surface 153 respectively.

Simultaneously referring to FIG. 1B to FIG. 3A, the integrating member 130 includes a main body 131, a conductive assembly 132 and plural electrical connectors 133. Preferably, the integrating member 130 is disposed along a second direction D2 which is different from the first direction D1. The conductive assembly 132 is electrically connected to a power supply 200. The electrical connectors 133 are connected to the conductive assembly 132, the first light source 161 and the second light source 162 to form an electrical loop. In other words, electrical power provided by the power supply 200 is transmitted from the integrating member 130 disposed along the second direction D2 through the conductive assembly 132 and the electrical connectors 133 to the first light source 161 and the second light source 162 disposed along the first direction D1.

Figure 3B:
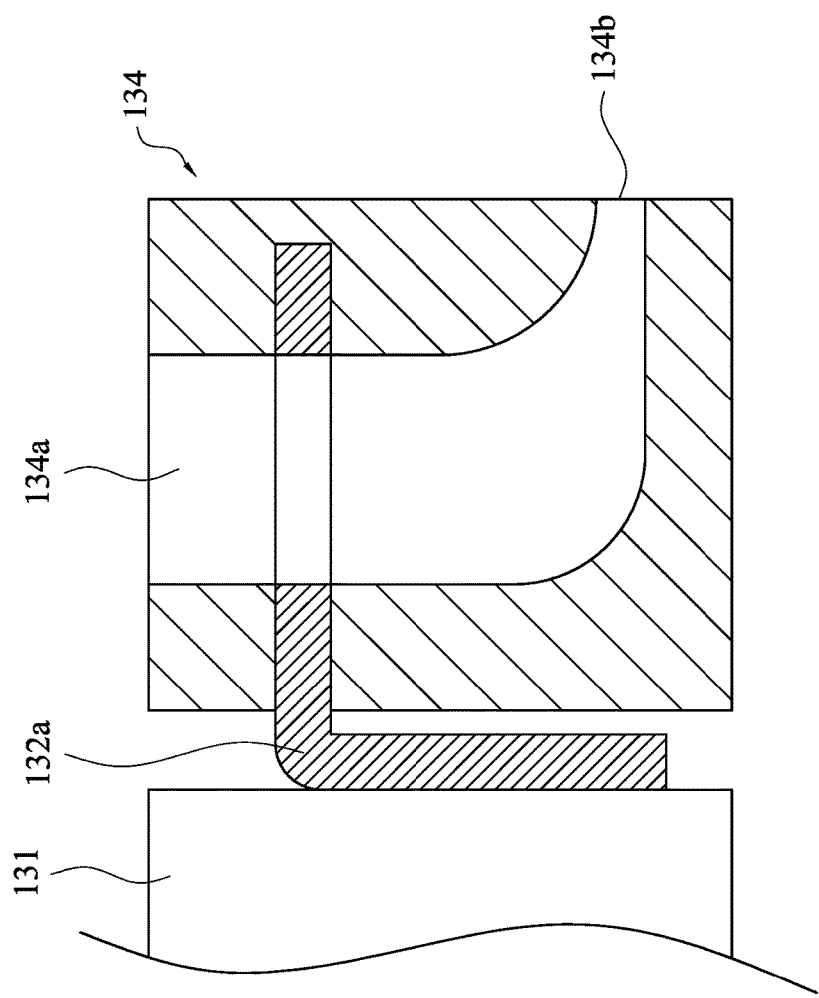
FIG. 3B is a schematic cross-sectional view of zone "A" in FIG. 3A.
Figure 3C:
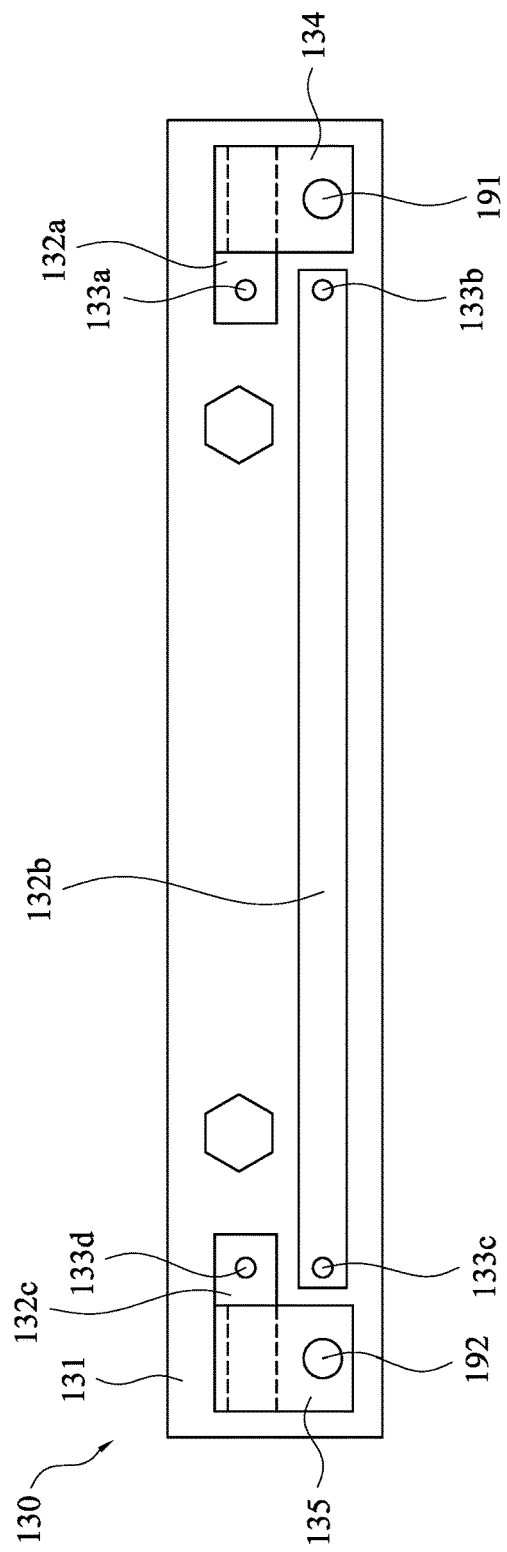
FIG. 3C is a schematic front view of FIG. 3A.

Referring to FIG. 3A to FIG. 3C, in which FIG. 3B is a schematic cross-sectional view of zone "A" in FIG. 3A, and FIG. 3C is a schematic front view of FIG. 3A. In one embodiment, the conductive assembly 132 is embedded in the main body 131. Moreover, conductive assembly 132 includes a first conductive plate 132a, a second conductive plate 132b and a third conductive plate 132c. In some examples, the main body 131 of the integrating member 130 is an insulation, and a portion of each of the first conductive plate 132a, the second conductive plate 132b and the third conductive plate 132c is disposed in the main body 131, and the other portion of each of the first conductive plate 132a, the second conductive plate 132b and the third conductive plate 132c is exposed out of the main body 131. In the present embodiment, the first conductive plate 132a and the third conductive plate 132c are respectively disposed on two ends of the main body 131, and the second conductive plate 132b is disposed between the first conductive plate 132a and the third conductive plate 132c, and the first conductive plate 132a, the second conductive plate 132b and the third conductive plate 132c are not connected to each other. In one example, the main body 131 is formed by an injection molding manner. A material used to form the main body 131 is injected into a mold to cover a portion of the conductive assembly 132, so that the conductive assembly 132 can be embedded in the main body 131. As shown in FIG. 3A, the integrating member 130 includes a reinforced plate 131a, the reinforced plate 131a is also embedded in the main body 131 but is not connected to the first conductive plate 132a, the second conductive plate 132b and the third conductive plate 132c. The reinforced plate 131a is used to increase the overall structural strength of the integrating member 130.

Referring to FIG. 3A to FIG. 3C again, a first connecting base 134 and a second connecting base 135 are respectively disposed on the two ends of the integrating member 130. In one embodiment, as shown in FIG. 3A and FIG. 3B, the first conductive plate 132a is an L-shaped structure, and a portion of the first conductive plate 132a is embedded in the first connecting base 134, and the other portion of the first conductive plate 132a is disposed on the main body 131. The third conductive plate 132c is also an L-shaped structure, and a portion of the third conductive plate 132c is embedded in the second connecting base 135, and the other portion of the third conductive plate 132c is disposed on the main body 131.

As shown in FIG. 3A and FIG. 3C, the electrical connectors 133 includes a first conductive post 133a, a second conductive post 133b, a third conductive post 133c and a fourth conductive post 133d. The first conductive post 133a is disposed on and electrically connected to the first conductive plate 132a. The second conductive post 133b and the third conductive post 133c are respectively disposed on two ends of the second conductive plate 132b and electrically connected to the second conductive plate 132b. The fourth conductive post 133d is disposed on and electrically connected to the third conductive plate 132c. In the present embodiment, the first conductive post 133a and the second conductive post 133b are disposed outside of the first connecting base 134, the third conductive post 133c and the fourth conductive post 133d are disposed outside of the second connecting base 135.

Figure 4:
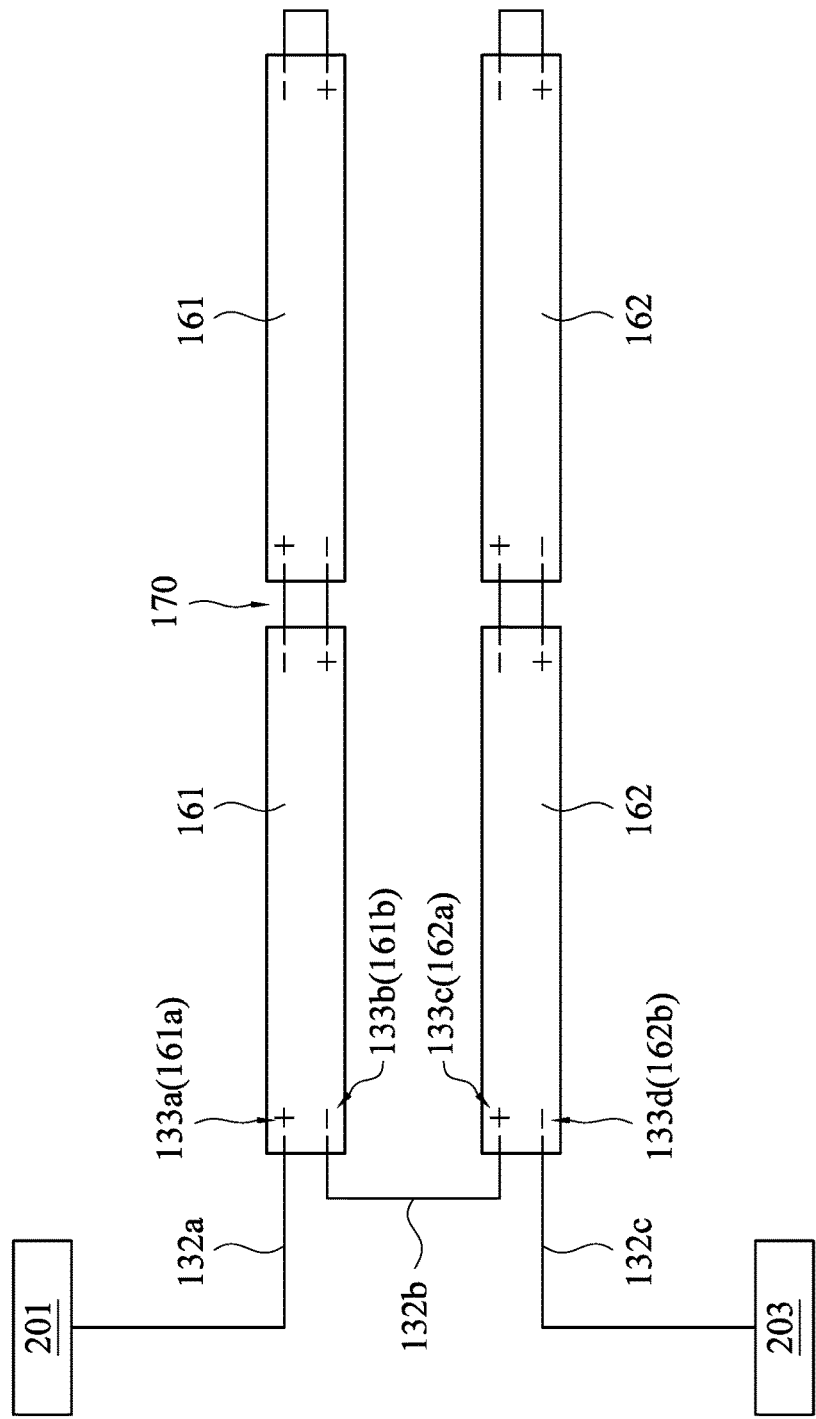
FIG. 4 is a schematic diagram showing a layout of electronic circuit of the lamp in accordance with an embodiment of the present invention.

Referring to FIG. 1B, FIG. 2A, FIG. 3A and FIG. 4, FIG. 4 is a schematic diagram showing a layout of electronic circuit of the lamp in accordance with an embodiment of the present invention. The first light source 161 has a first input terminal 161a and a first output terminal 161b, and the first conductive post 133a and the second conductive post 133b are respectively inserted into the first input terminal 161a and the first output terminal 161b. Similarly, the second light source 162 has a second input terminal 162a and a second output terminal 162b, and the third conductive post 133c and the fourth conductive post 133d are respectively inserted into the second input terminal 162a and a second output terminal 162b. In the present embodiment, the first conductive plate 132a is electrically connected to a first power supply terminal 201 of the power supply 200, and the third conductive plate 132c is electrically connected to a second power supply terminal 203 of the power supply 200. Therefore, as shown in FIG. 4, an electric current flowing out from the first power supply terminal 201 of the power supply 200 may be inputted into the first light source 161 from the first input terminal 161a via the first conductive plate 132a, and then outputted from the first output terminal 161b. The electric current flowing out from the first output terminal 161b, may flow from the second conductive post 133b to the third conductive post 133c on the second conductive plate 132b, flow into the second light source 162, and then flow back to the power supply 200 from the second output terminal 162b.

Figure 5:
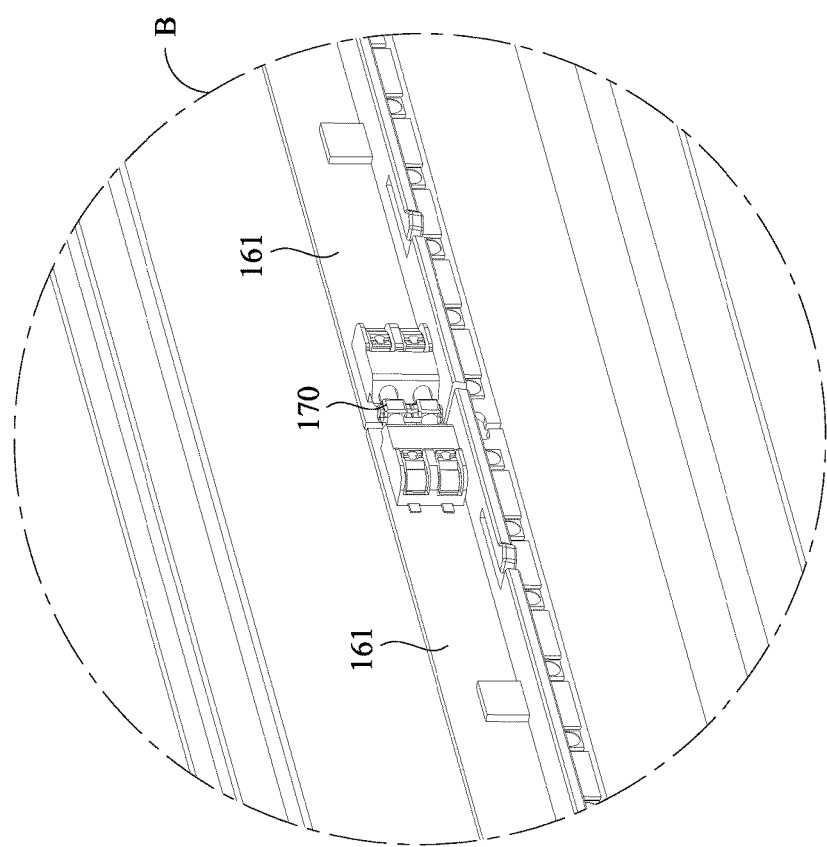
FIG. 5 is an enlarged view of zone "B" in FIG. 1B.

In addition. Simultaneously referring to FIG. 1B and FIG. 5, FIG. 5 is an enlarged view of zone "B" in FIG. 1B. In the present embodiment, the number of the first light source 161 can be two, and the first light sources 161 can be connected in series via a connector 170. In other embodiment, the number of the first light source 161 is not limited to two, and it is possible to utilize different number of first light source 161 according to a length of the side cover 140. Similarly, in other embodiments, the number of the second light source 162 can be utilized according to a length of the side cover 140.

Figure 6:
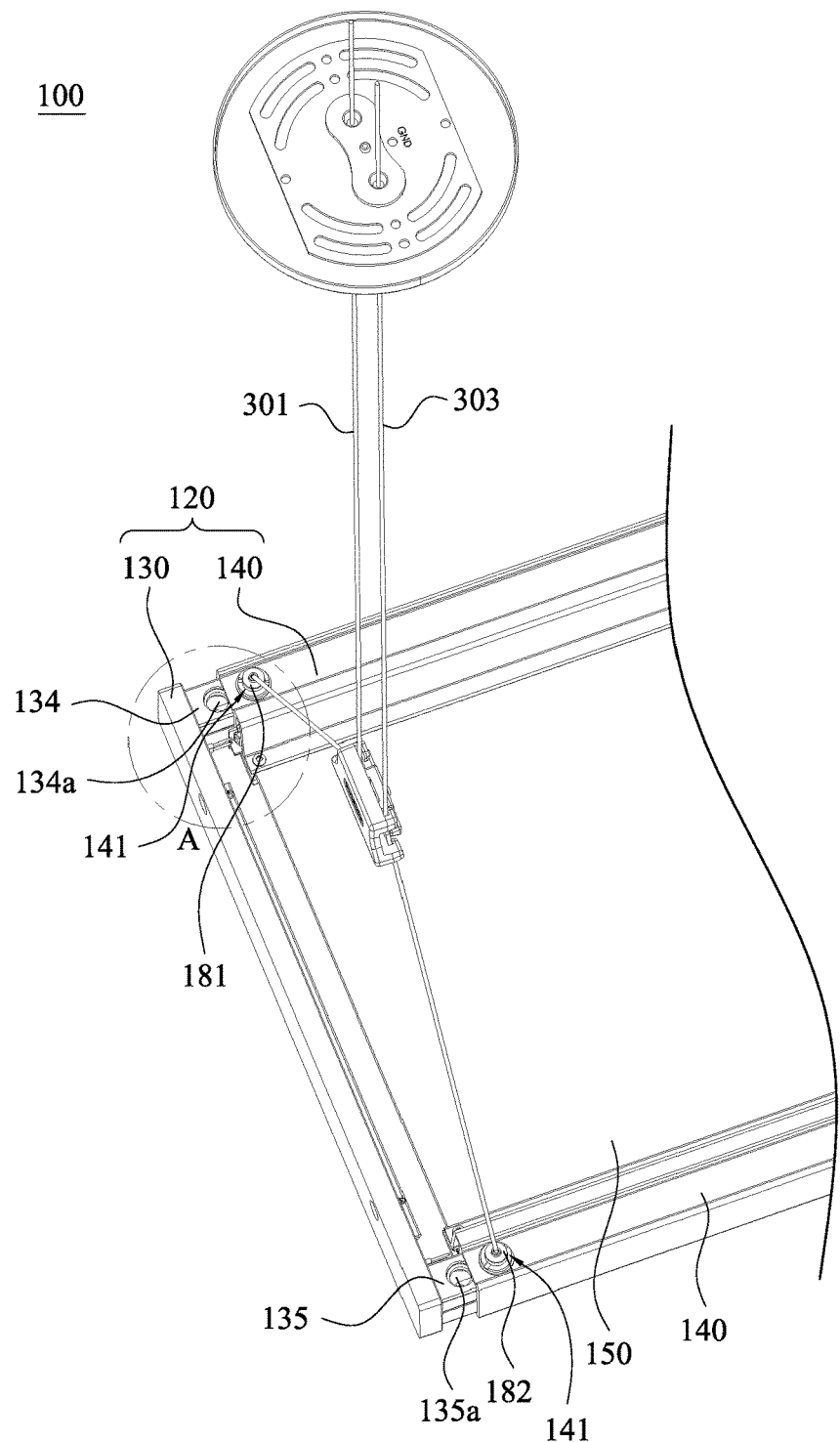
FIG. 6 is a partial exploded view showing the lamp in accordance with an embodiment of the present invention.
Figure 7:
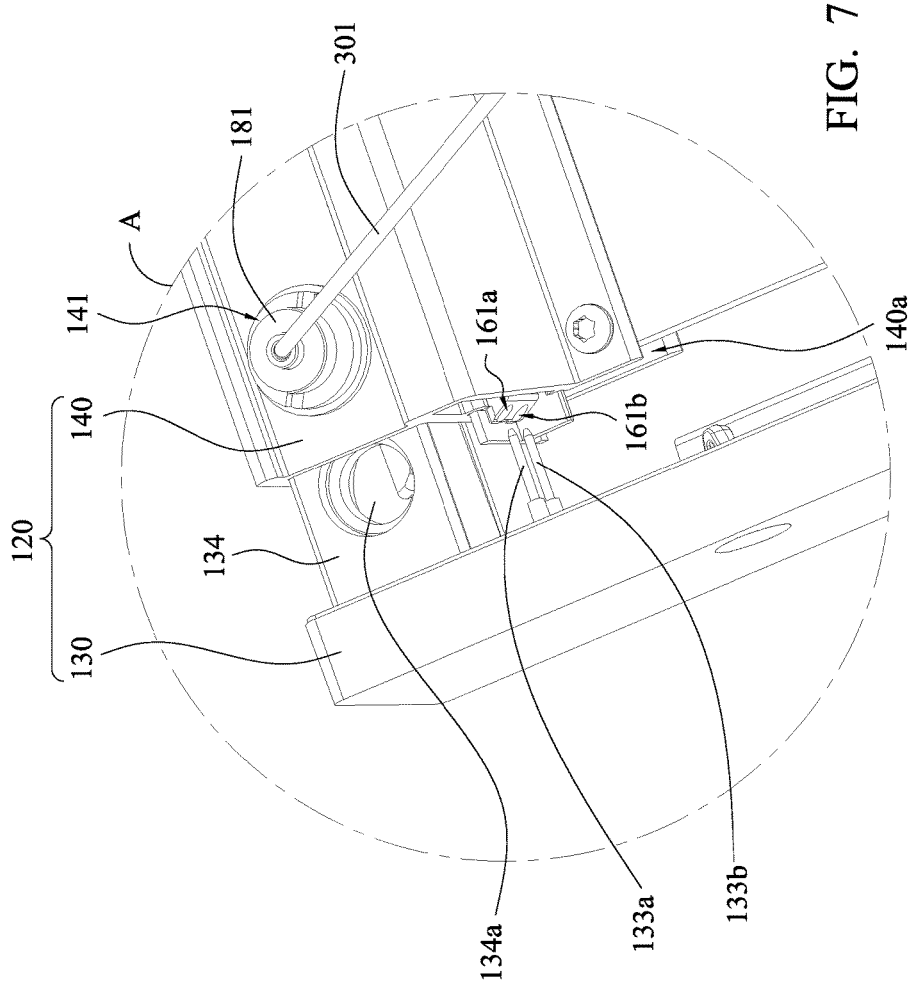
FIG. 7 is an enlarged view of zone "A" in FIG. 6.

Referring to FIG. 3A, FIG. 6 and FIG. 7, FIG. 7 is an enlarged view of zone "A" in FIG. 6. In one embodiment, a through hole 134a and a through hole 134b are respectively disposed on a top surface and a side surface of the first connecting base 134, in which the through hole 134a communicates with the through hole 134b. In the present embodiment, the through hole 134a is configured to dispose a first conductive base 181. As shown in FIG. 3A, FIG. 6 and FIG. 7, the side cover 140 can be a tube structure, and one end of the side cover 140 is disposed on the first connecting base 134. After inserted into a through hole 141 of the side cover 140 and the first conductive plate 132a, the first conductive base 181 is fixed in the through hole 134a and is connected to the first conductive plate 132a.

Referring to FIG. 1B, FIG. 3A and FIG. 7 again, in the present embodiment, the first conductive base 181 can be used to fix a first charged cable 301, and the first charged cable 301 is connected to the first power supply terminal 201 of the power supply 200. In one embodiment, one end of the first charged cable 301 is connected to the first power supply terminal 201 of the power supply 200, and the other end is fixed on the first connecting base 134 and is connected to the first conductive plate 132a. As shown in FIG. 1B and FIG. 3A, in some embodiments, the lamp 100 further includes a first tube 191. The first tube 191 is connected to the through hole 134b of the first connecting base 134. When one end of the side cover 140 is disposed on the first connecting base 134, the first tube 191 is located in the side cover 140. Therefore, as shown in FIG. 1B, FIG. 3A and FIG. 7, one end of the first charged cable 301 is inserted into the through hole 134a and the through hole 134b from the first conductive base 181, and extends in the first tube 191, so that a portion of the first charged cable 301 can be hidden in the first tube 191 and the side cover 140.

Referring to FIG. 1B, FIG. 3A and FIG. 6, in one embodiment, a through hole 135a and a through hole 135b are respectively disposed on a top surface and a side surface of the second connecting base 135, in which the through hole 135a communicates with the through hole 135b. In the present embodiment, the through hole 135a is configured to dispose a second conductive base 182. As shown in FIG. 6, the side cover 140 can be a tube structure, and one end of the side cover 140 is disposed on the second connecting base 135. After inserted into the through hole 141 of the side cover 140 and the third conductive plate 132c, the second conductive base 182 is fixed in the through hole 135a of the second connecting base 135 and is connected to the third conductive plate 132c.

Referring to FIG. 1B, FIG. 3A, and FIG. 6 again, in the present embodiment, the second conductive base 182 can be used to fix a second charged cable 303, and the second charged cable 303 is connected to the second power supply terminal 203 of the power supply 200. In one embodiment, one end of the second charged cable 303 is connected to the second power supply terminal 203 of the power supply 200, and the other end is fixed on the second connecting base 135 and is connected to the third conductive plate 132c. As shown in FIG. 1B and FIG. 3A, in some embodiments, the lamp 100 further includes a second tube 192. The second tube 192 is connected to the through hole 135b of the second connecting base 135. When one end of another side cover 140 is disposed on the second connecting base 135, the second tube 192 is located in the side cover 140. Therefore, as shown in FIG. 7, one end of the second charged cable 303 is inserted into the through hole 135a and the through hole 135b from the second conductive base 182, and extends in the second tube 192, so that a portion of the second charged cable 303 can be hidden in the second tube 192 and the side cover 140.

From the embodiments, it can be known that, the electric current flowing out from the first power supply terminal 201 of the power supply 200 may be inputted into the first light source 161 from the first conductive post 133a and then outputted from the second conductive post 133b. The electric current flowing out from the second conductive post 133b, may flow from the second conductive post 133b to the third conductive post 133c on the second conductive plate 132b, flow into the second light source 162, and then flow from the fourth conductive post 133d back to the power supply 200.

Referring to FIG. 1B again, the frame body 120 further includes an assembly frame 400. The assembly frame 400 and the integrating member 130 are respectively disposed on two opposite sides of the light guide plate 150. The structure of the assembly frame 400 is similar to that of the integrating member 130, and the main difference therebetween is that the assembly frame 400 is not electrically connected to the first light source 161, the second light source 162 and the power supply 200. As shown in FIG. 1B, the assembly frame 400 includes a first assembly base 401 and a second assembly base 403. Therefore, one end of one of side cover 140 can be disposed on the first connecting base 134 of integrating member 130, the other end can be disposed on the first assembly base 401 of the assembly frame 400. Similarly, one end of another side cover 140 can be disposed on the second connecting base 135 of integrating member 130, the other end can be disposed on the second assembly base 403 of the assembly frame 400.

Referring to FIG. 1B, a first non-conductive base 405 and a second non-conductive base 407 are respectively disposed on the first assembly base 401 and the second assembly base 403. Moreover, a first uncharged cable 409 and a second uncharged cable 411 are respectively connected to the first assembly base 401 and the second assembly base 403 via first non-conductive base 405 and the second non-conductive base 407.

Figure 8:
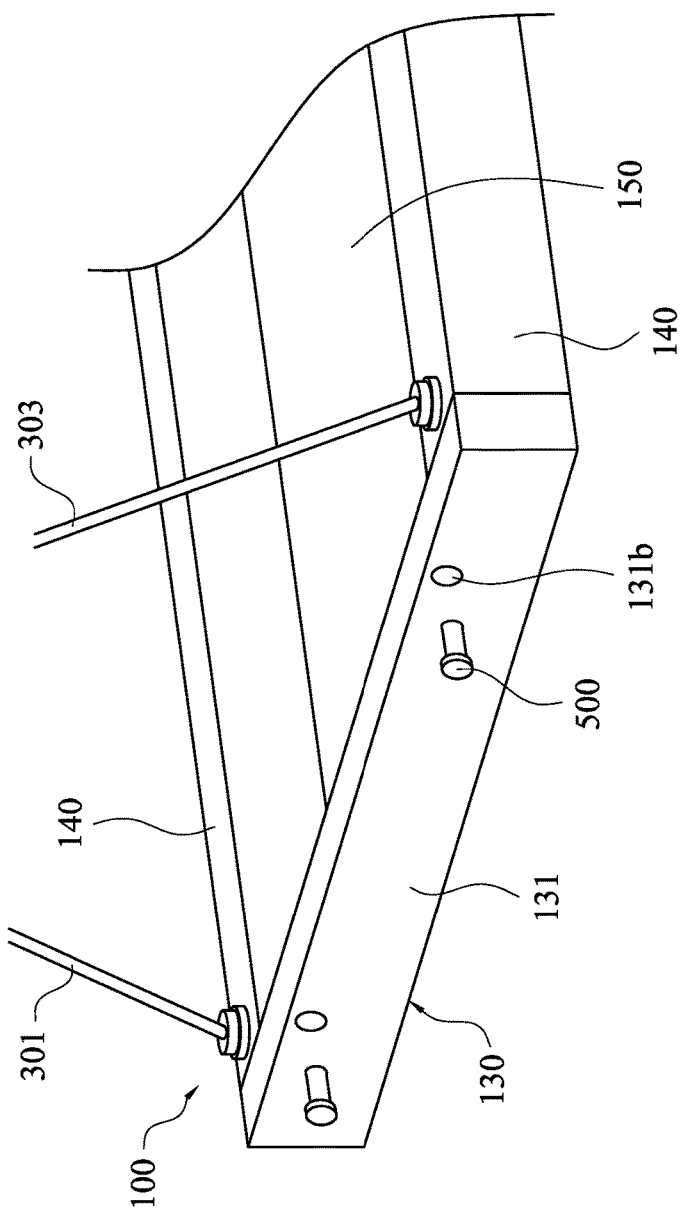
FIG. 8 is a partial structural diagram showing the lamp in accordance with an embodiment of the present invention.
Figure 9:
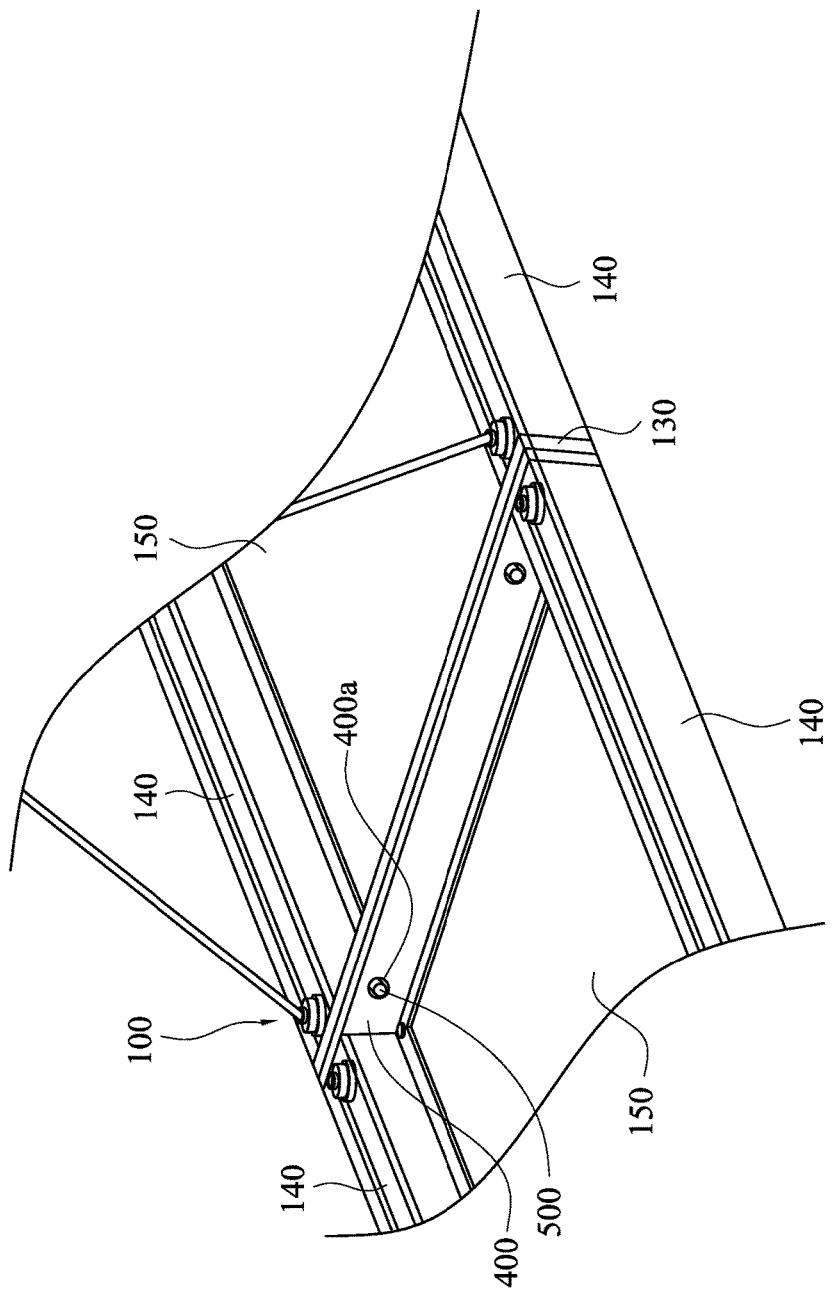
FIG. 9 is a schematic diagram showing multiple lamps jointed together in accordance with an embodiment of the present invention.

In addition, referring to FIG. 8 and FIG. 9, FIG. 8 is a partial structural diagram showing the lamp in accordance with an embodiment of the present invention, and FIG. 9 is a schematic diagram showing multiple lamps jointed together in accordance with an embodiment of the present invention. As shown in FIG. 8 and FIG. 9, two adjacent lamps 100 can be jointed together by fixing members 500. In some embodiments, the main body 131 of the integrating member 130 has plural fixing holes 131b (as shown in FIG. 8), and the assembly frame 400 also has plural fixing holes 400a (as shown in FIG. 9). Therefore, adjacent lamps 100 can be jointed together by inserting and fixing the fixing member 500 in the fixing hole 400a of the assembly frame 400 and the fixing hole 131b of the of the integrating member 130 of another lamp 100. It is noted that the fixing holes 131b are disposed above and separated from the conductive assembly 132 on the main body 131. In addition, because the main body 131 is an insulation, when fixed on the integrating member 130, the fixing members 500 will not conduct electricity with the conductive assembly 132.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

The invention claimed is:

1. A lamp, comprising:
a frame body having an accommodating space, wherein the frame body comprises at least one integrating member and a plurality of side covers, and the integrating member comprises a main body, a conductive assembly and a plurality of electrical connectors;
a power supply, wherein the power supply comprises a first power supply terminal and a second power supply terminal;
a light guide plate disposed in the accommodating space; and
a plurality of light sources respectively disposed in the side covers and disposed adjacent to side edges of the light guide plate,
wherein the conductive assembly is disposed on one side of the integrating member near the light guide plate, and the conductive assembly is connected to the light sources to form an electrical loop;
wherein the conductive assembly comprises:
a first conductive plate disposed on the main body and electrically connected to the first power supply terminal;
a second conductive plate disposed on the main body; and
a third conductive plate disposed on the main body and electrically connected to the second power supply terminal;
wherein the first conductive plate, the second conductive plate and the third conductive plate are spaced from each other at distances, and the first conductive plate and the second conductive plate are electrically connected to each other via one portion of the electrical connectors, and the second conductive plate and the third conductive plate are electrically connected to each other via the other portion of the electrical connectors.

2. The lamp of claim 1, wherein
the light guide plate has a first light-incident surface and a second light-incident surface; and
the light sources comprises:
a first light source disposed adjacent to the first light-incident surface, wherein the first light source is electrically connected between the first conductive plate and the second conductive plate; and
a second light source disposed adjacent to the second light-incident surface, wherein the second light source is electrically connected between the second conductive plate and the third conductive plate.

3. The lamp of claim 2, wherein the electrical connectors comprises a first conductive post, a second conductive post, a third conductive post and a fourth conductive post, wherein the first conductive post is electrically connected to the first conductive plate, and the second conductive post and the third conductive post are electrically connected to the second conductive plate, and the fourth conductive post is electrically connected to the third conductive plate.

4. The lamp of claim 3, wherein
the first light source comprises:
a first input terminal electrically connected to the first conductive post; and
a first output terminal electrically connected to the second conductive post; and
the second light source comprises:
a second input terminal electrically connected to the third conductive post; and
a second output terminal electrically connected to the fourth conductive post.

5. The lamp of claim 1, wherein the integrating member comprises:
a first connecting base disposed on the main body, wherein a portion of the first conductive plate is embedded in the first connecting base; and
a second connecting base disposed on the main body, wherein a portion of the third conductive plate is embedded in the second connecting base.

6. The lamp of claim 5, further comprises:
a first charged cable, wherein one end of the first charged cable is connected to the first power supply terminal of the power supply, and the other end of the first charged cable is fixed on the first connecting base and is connected to the first conductive plate; and
a second charged cable, wherein one end of the second charged cable is connected to the second power supply terminal of the power supply, and the other end of the first charged cable is fixed on the second connecting base and is connected to the third conductive plate.

7. The lamp of claim 6, wherein
the other end of the first charged cable is fixed on the first connecting base via a first conductive base; and
the other end of the second charged cable is fixed on the second connecting base via a second conductive base.

8. The lamp of claim 6, further comprises a first tube and a second tube, wherein
the first tube is connected to a first through hole of the first connecting base, and the other end of the first charged cable passes through the first through hole and is extended into the first tube; and
the second tube is connected to a second through hole of the second connecting base, and the other end of the second charged cable passes through the second through hole and is extended into the second tube.

9. The lamp of claim 1, wherein the main body of the integrating member is an insulation, and one portion of each of the first conductive plate, the second conductive plate and the third conductive plate is embedded in the main body, and the other portion of each of the first conductive plate, the second conductive plate and the third conductive plate is exposed out of the main body.

10. The lamp of claim 1, wherein the integrating member comprises a reinforced plate, and the reinforced plate is embedded in the main body and is not connected to the first conductive plate, the second conductive plate and the third conductive plate.

11. A lamp, comprising:
a frame body having an accommodating space, wherein the frame body comprises at least one integrating member and a plurality of side covers, and the integrating member comprises a conductive assembly;
a light guide plate disposed in the accommodating space; and
a plurality of light sources respectively disposed in the side covers and disposed adjacent to side edges of the light guide plate,
wherein the conductive assembly is disposed on one side of the integrating member near the light guide plate, and the conductive assembly is connected to the light sources to form an electrical loop;
wherein the frame body comprises an assembly frame, and a first side of the light guide plate is disposed on the integrating member, and a second side opposite to the first side of the light guide plate is disposed on the assembly frame, and wherein the assembly frame comprises a first assembly base and a second assembly base;

wherein the lamp further comprises:

a first uncharged cable, wherein one end of the first uncharged cable is connected to the first assembly base, and the other end of the first uncharged cable is extended out of the first assembly base; and a second uncharged cable, wherein one end of the second uncharged cable is connected to the second assembly base, and the other end of the second uncharged cable is extended out of the second assembly base.

12. The lamp of claim 11, wherein the other end of the first uncharged cable is fixed on the first assembly base via a first non-conductive base; and the other end of the second uncharged cable is fixed on the assembly base via a second non-conductive base.

13. The lamp of claim 11, further comprises a first tube and a second tube, wherein the first tube is connected to a first through hole of the first assembly base, and the other end of the first uncharged cable passes through the first through hole and is extended into the first tube; and the second tube is connected to a second through hole of the second assembly base, and the other end of the second uncharged cable passes through the second through hole and is extended into the second tube.

* * * * *